UNITED STATES PATENT OFFICE.

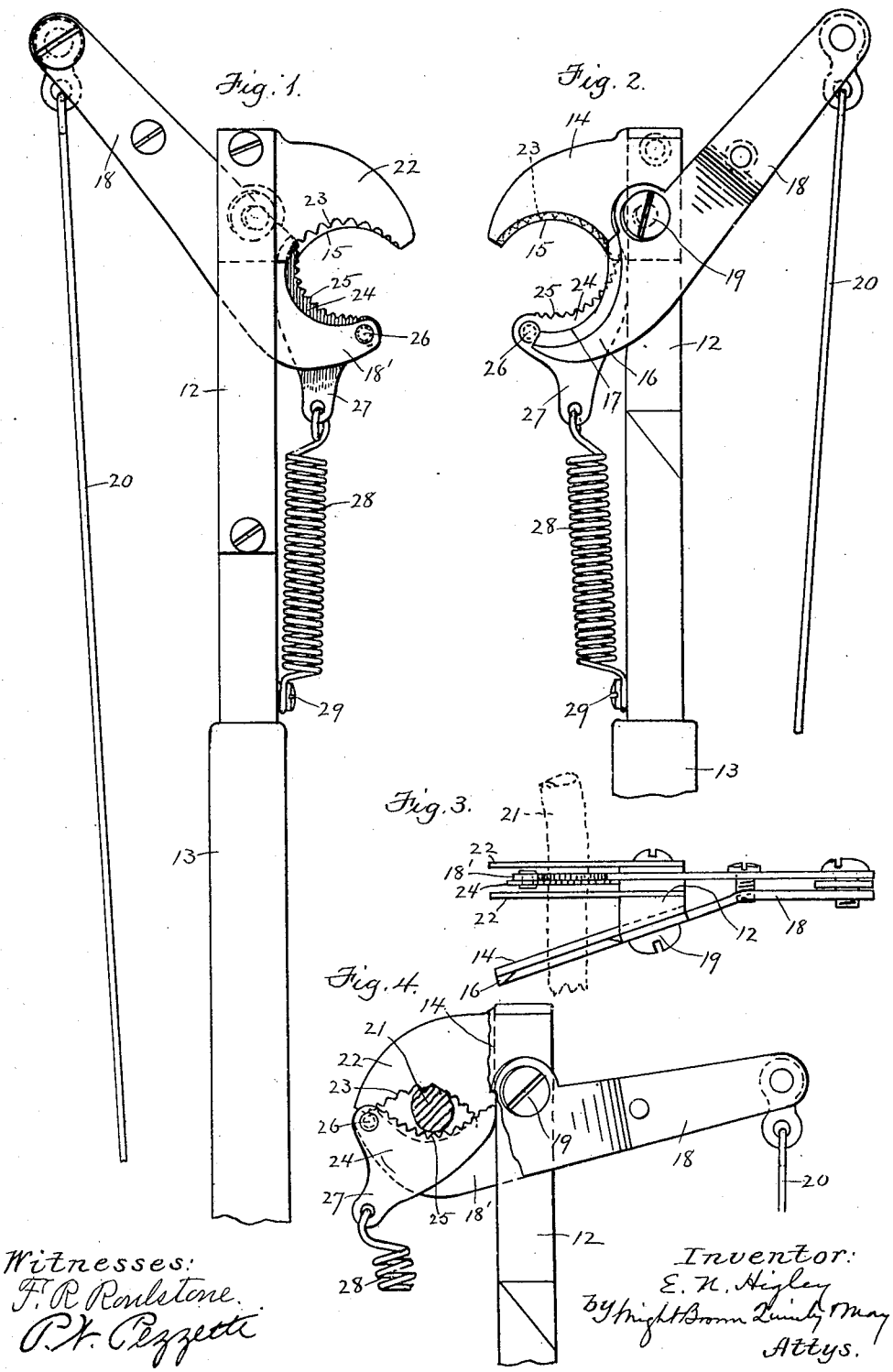

EBEN N. HIGLEY, OF SOMERSWORTH, NEW HAMPSHIRE, ASSIGNOR TO MAUDE HIGLEY, OF SOMERSWORTH, NEW HAMPSHIRE.

PRUNING IMPLEMENT.

No. 913,290.     Specification of Letters Patent.     Patented Feb. 23, 1909.

Application filed September 14, 1908. Serial No. 452,825.

*To all whom it may concern:*

Be it known that I, EBEN N. HIGLEY, of Somersworth, in the county of Strafford and State of New Hampshire, have invented certain new and useful Improvements in Pruning Implements, of which the following is a specification.

This invention relates to a pruning implement comprising a pair of shears or pruning members, one of which is affixed to a shank carried usually by an elongated rod or pole, while the other is pivoted to said shank and affixed to the shorter arm of a lever, the longer arm of which is adapted to be moved to close the shearing members upon a branch and sever the same.

The invention has for its object to provide an implement of this character having means for clamping the branch to be severed, at a point in close proximity to the shears, and in such manner that the implement may be operated to sever a branch without exerting injurious breaking strain thereon.

The invention consists in the improvements which I will now proceed to describe and claim.

Of the accompanying drawings, forming a part of this specification,—Figure 1 represents a side elevation of a pruning implement embodying my invention. Fig. 2 represents an elevation of the opposite side of the implement. Fig. 3 represents an end view of the same. Fig. 4 represents a side elevation showing the pruning members broken away and illustrating the operation of the clamping members hereinafter referred to.

The same reference characters indicate the same parts in all the figures.

In the drawings, 12 represents a shank which is rigidly affixed to an elongated rod or pole 13, which is of sufficient length to enable the implement to be operated at an elevated point in a tree by a person standing on the ground.

14 represents a fixed shearing member or blade, the cutting edge 15 of which is preferably curved, said member being rigidly secured to the shank 12 and projecting from one side of the same.

16 represents a movable shearing member or blade having a curved cutting edge 17 facing the edge 17. The movable shearing member 16 is carried by a lever 18 which is pivoted at 19 to the shank 12, the shearing member 16 and lever 18 being preferably integral with each other, the shearing member 16 constituting the shorter arm of the lever. To the longer arm of the lever is connected an elongated operating rod 20 extending to the lower end portion of the pole 13 where it may be connected with an operating lever pivoted to the pole, as usual in implements of this character. The arrangement of the shearing members 14 and 16 is such that when power is applied to the lever 18 to move the member 16 toward the member 14, the cutting edges of said members will coöperate in shearing off a branch or twig 21 interposed between said cutting edges.

It has been found that in operation of pruning implements of this character, the closing movement of the pruning members is liable to exert a breaking strain on the branch to be severed, thus involving injury to the tree or shrub.

To obviate the above mentioned objection is the object of my invention, and to this end I provide the shank 12 with a pair of clamping members located beside the pruning members, one of said members being affixed to the shank 12 and the other carried by the lever 18.

22 represents the fixed clamping member which is rigidly attached to the shank at a point beside the fixed pruning member 14, and is provided with a curved clamping edge 23 which is preferably serrated and coincides with the cutting edge 15.

24 represents the movable clamping member which has a curved clamping edge 25 also preferably serrated and opposed to the serrated clamping edge 23. The lever 18 is provided with a branch 18′ located beside the movable shearing member 16, said branch and the movable shearing member constituting a bifurcated lever arm. The movable clamping member 24 is preferably pivoted at 26 to the branch 18′, and is provided with a downwardly projecting ear 27 to which is connected one end of a spring 28, the other end of which is secured at 29 to the shank 12. The inner end of the movable clamping member 24 is in sliding contact with one side of the shank 12, the arrangement being such that when the said movable member is raised it is permitted to yield after it comes to a bearing on the branch 21, as indicated in Fig. 4.

The fixed clamping member is preferably composed of two arms located side by side and separated from each other by a space in which the lever arm 18' and the movable clamping member 24 are adapted to move, as indicated in Fig. 3, provision being thus made for supporting the branch by the fixed clamping member at opposite sides of the path of the movable clamping member.

It will be seen from the foregoing that when the lever 18 is moved to cause the cutting action of the pruning members, the two divisions of the fixed clamping member support the upper side of the branch against the upward pressure exerted on it by the movable shearing member, and that the movable clamping member moves upwardly with the movable shearing member and is pressed against the under side of the branch 21 during the shearing operation, so that the branch is firmly held or clamped at a point in close proximity to the point where it is severed, breaking strain on the branch being thus prevented. When the lever 18 is released, the spring 28 acts to move the movable shearing and clamping members from the fixed shearing and clamping members.

The shearing members are preferably obliquely arranged relatively to the clamping members, as indicated in Fig. 3, so that they sever the branch diagonally, this being an advantage because less power is required than would be required if the line of cut were directly across or at right angles to the length of the branch.

The fixed shearing member and the fixed clamping member have concave lower edges, imparting a hooked form to these members. The said members project from one side of the operating rod, and this fact, together with their hooked form, enables the members to be conveniently engaged with an elevated limb or twig, and draw the same downwardly to enable it to be conveniently severed by the operation of the device.

I claim:

1. A pruning device comprising an elongated operating rod, a shank affixed thereto and having a fixed clamping member, and a fixed shearing member located beside the fixed clamping member, said members projecting from one side of the rod and being hooked to engage an elevated limb, a pivoted shearing member adapted to coöperate with the fixed shearing member and provided with an operating lever, and a movable clamping member carried by said lever and adapted to coöperate with the fixed clamping member.

2. A pruning device comprising an elongated operating rod, a shank affixed thereto and having a fixed clamping member, and a fixed shearing member located beside the fixed clamping member, said members projecting from one side of the rod and being hooked to engage an elevated limb, a pivoted shearing member adapted to coöperate with the fixed shearing member and provided with an operating lever, and a movable clamping member pivoted to one arm of said lever, and having an independent yielding movement.

3. A pruning device comprising an elongated operating rod, a shank affixed thereto and having a fixed clamping member, and a fixed shearing member located beside the fixed clamping member, each of said members being hooked so that the two members are adapted to conjointly engage and draw down an elevated limb, a pivoted shearing member adapted to coöperate with the fixed shearing member and provided with an operating lever, a movable clamping member located beside the movable shearing member and connected with the latter so that movement imparted to the movable shearing member by its operating lever is imparted to the movable clamping lever, and means for yieldingly holding the movable clamping member in yielding contact with a limb or twig interposed between the two pairs of members.

4. A pruning device comprising a shank having a fixed clamping member, a fixed shearing member located beside the fixed clamping member, a pivoted shearing member adapted to coöperate with the fixed shearing member and provided with an operating lever, a movable clamping member pivoted to one arm of said lever, and a spring connected with the movable clamping member and with the shank and maintaining a yielding pressure on said clamping member.

5. A pruning device comprising a shank having a fixed clamping member and a fixed shearing member located side by side, a lever pivoted to the shank and having a bifurcated shorter arm, a shearing member affixed to one of the divisions of said arm and arranged to coöperate with the fixed shearing member, and a movable clamping member carried by the other division of said arm, and arranged to coöperate with the fixed clamping member.

In testimony whereof I have affixed my signature, in presence of two witnesses.

EBEN N. HIGLEY.

Witnesses:
C. F. BROWN,
P. W. PEZZETTI.